May 5, 1925. 1,536,509

N. LOZANO

HUB AND SPOKE CONNECTION

Filed Feb. 23, 1924

Inventor
Nicolás Lozano
By Emil Bönnelycke
Attorney

Patented May 5, 1925.

1,536,509

UNITED STATES PATENT OFFICE.

NICOLÁS LOZANO, OF MARCOS PAZ, ARGENTINA.

HUB AND SPOKE CONNECTION.

Application filed February 23, 1924. Serial No. 694,616.

*To all whom it may concern:*

Be it known that I, NICOLÁS LOZANO, citizen of the Republic of Argentina, residing at Marcos Paz, F. C. O., Republic of Argentina, have invented certain new and useful Improvements in Hub and Spoke Connections, of which the following is a specification.

My present invention relates to certain improvements in the means for fixing the spokes to the hub of the wheel, its main object being to provide an improved means by which spokes in the form of curved spring blades may be fixed to the hub of the wheel.

Figure 1:
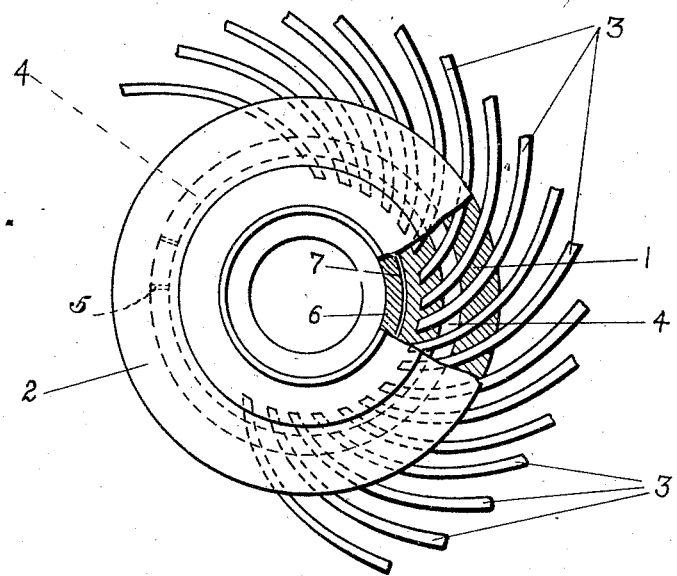

In order that my present invention may be clearly understood and easily carried into practice a preferred embodiment thereof has been shown in the appended drawings wherein, Figure 1 is a view of part of a hub of a wheel with the spokes in position and a flange partially broken away.

Figure 2:
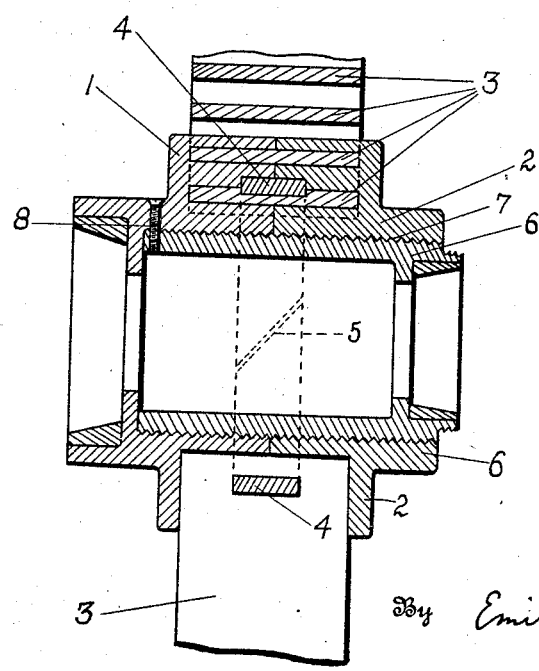

Figure 2 is a central diametrical section the lower part being a projection on one of the spring blades or spokes.

Similar characters of reference denote same or like parts throughout the said figures.

According to my present invention the hub of the wheel consists of a cylindrical casing built up of two halves 1 and 2, said parts being internally screwthreaded. This casing comprising the two halves has flanges thereon which are slotted so that it will retain the spring blades 3 in spaced relation, as clearly shown on the drawing. 3 are the spring blades which constitute the spokes of the wheel, the ends of which are lodged in corresponding sockets within the casing. Said spokes are provided with corresponding openings through which a spring metal ring 4 is passed said ring having its ends biased as shown in 5, whereby the parts are firmly held in position.

In order to rigidly connect both halves 1 and 2 of the hub a bushing 6 with its outer portion screw threaded, as shown at 7, is screwed in the inner screw threaded surfaces of said casing.

A set screw 8 holds said bushing in a locked position.

In this very simple and economical manner an efficient and firm connection is obtained and the parts may be quickly assembled and disassembled.

The manner of assembly and the working of the device will be easily understood and do not require any further explanation.

It is obvious that many constructional and other changes may be introduced without departing from the scope of my present invention which has been clearly set forth in the appended claims.

Having now fully described and ascertained the nature of my present invention and in what manner the same is to be carried into practice I declare that what I claim and desire to protect by Letters Patent is:—

An improved hub and spoke connection comprising a casing; a plurality of spring blades in said casing each having an opening therein; and a spring ring in said openings adapted to secure the blades in said casing.

In testimony whereof I affix my signature.

NICOLÁS LOZANO.